US011396443B2

(12) United States Patent
Illedits et al.

(10) Patent No.: US 11,396,443 B2
(45) Date of Patent: Jul. 26, 2022

(54) DRIVE SYSTEMS FOR PEOPLE CONVEYORS

(71) Applicant: Otis Elevator Company, Farmington, CT (US)

(72) Inventors: Thomas Illedits, Vienna (AT); Alexander Turek, Münchendorf (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/952,388

(22) Filed: Nov. 19, 2020

(65) Prior Publication Data

US 2021/0229958 A1    Jul. 29, 2021

(30) Foreign Application Priority Data

Jan. 24, 2020 (EP) .................................... 20153698

(51) Int. Cl.
| | |
|---|---|
| *B66B 23/02* | (2006.01) |
| *B66B 21/04* | (2006.01) |
| *F16H 1/28* | (2006.01) |
| *F16H 1/32* | (2006.01) |
| *F16H 1/46* | (2006.01) |

(52) U.S. Cl.
CPC .............. *B66B 23/02* (2013.01); *B66B 21/04* (2013.01); *F16H 1/28* (2013.01); *F16H 1/32* (2013.01); *F16H 1/46* (2013.01)

(58) Field of Classification Search
None
See application file for complete search history.

(56) References Cited

U.S. PATENT DOCUMENTS

| | | | | | |
|---|---|---|---|---|---|
| 4,828,049 | A | * | 5/1989 | Preis | ....................... B25F 5/001 173/217 |
| 10,094,437 | B2 | * | 10/2018 | Schedl | ..................... B66B 21/02 |
| 10,519,007 | B2 | * | 12/2019 | Kikuchi | .................. B66B 25/00 |
| 10,689,231 | B2 | * | 6/2020 | Schedl | ..................... B66B 27/00 |
| 10,974,932 | B2 | * | 4/2021 | Tautz | .................... B66B 25/006 |

FOREIGN PATENT DOCUMENTS

| | | | |
|---|---|---|---|
| CN | 106241582 | A * | 12/2016 |
| CN | 112209212 | A * | 1/2021 |
| EP | 3290381 | A1 | 3/2018 |
| EP | 3339236 | A1 | 6/2018 |
| EP | 3543195 | A1 | 9/2019 |

OTHER PUBLICATIONS

European Search Report for application EP 201536983.4, dated Aug. 28, 2020, 53 pages.

* cited by examiner

*Primary Examiner* — Leslie A Nicholson, III
(74) *Attorney, Agent, or Firm* — Cantor Colburn LLP

(57) ABSTRACT

A drive system (8) for a belt-driven people conveyor (2) is provided which includes a drive motor (10) arranged to drive an input shaft (16); a belt drive pulley (12) for driving a drive belt (6); and a gear system (20) arranged to couple the input shaft (16) to the belt drive pulley (12) such that there is a speed reduction from the input shaft (16) to the belt drive pulley (12). The gear system (20) comprises an output gear (40) directly connected to or formed integrally with the belt drive pulley (12) and at least part of the gear system (20) is located within the belt drive pulley (12).

15 Claims, 9 Drawing Sheets

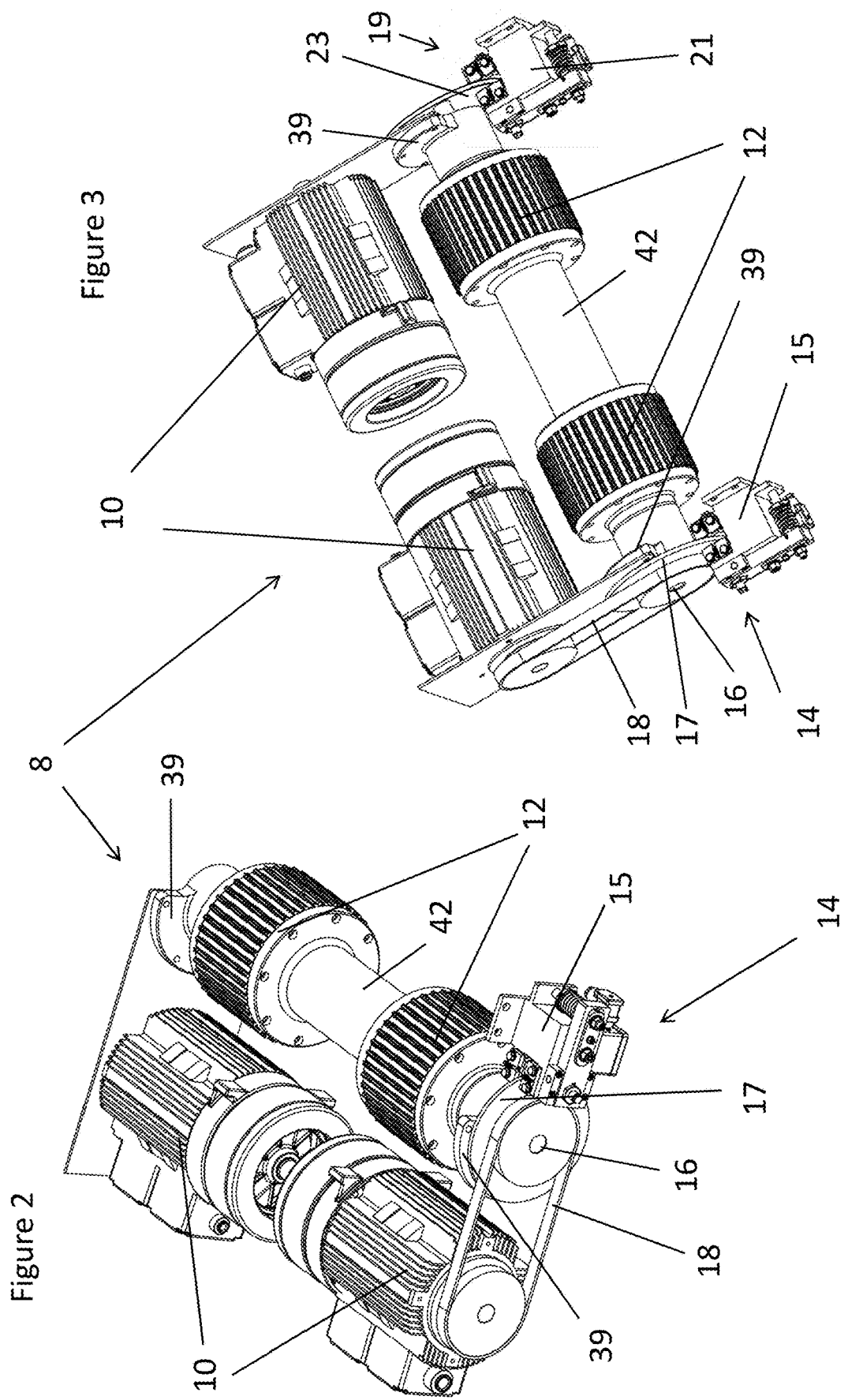

DRIVE SYSTEMS FOR PEOPLE CONVEYORS

FOREIGN PRIORITY

This application claims priority to European Patent Application No. 20153698.4, filed 8 Jan. 24, 2020, and all the benefits accruing therefrom under 35 U.S.C. § 119, the contents of which in its entirety are herein incorporated by reference.

TECHNICAL FIELD

The present disclosure relates to drive systems for people conveyors, such as escalators.

BACKGROUND

Conventional people conveyors comprise a set of conveyance elements (e.g. escalator steps or moving walkway pallets) on which passengers stand that are propelled by a drive system to convey the passengers from one place to another (e.g. between floors of a building). The conveyance elements are typically connected to an endless conveyance element chain (e.g. an escalator step chain) made up of multiple chain links that passes over a drive sprocket. The drive sprocket is rotated by the drive system, driving the endless conveyance element chain to pull the conveyance elements along (e.g. up or down inclined guide rails). Each conveyance element is carried in a continuous loop by the endless conveyance element chain, carrying passengers from one end of the people conveyor to the other (e.g. up an incline), before looping back.

Over the lifetime of the people conveyor, the pins and sockets that connect the chain links of the conveyance element chain can become worn, leading to potentially dangerous elongation of the endless conveyance element chain. It is, therefore, desirable to utilise as few chain links as possible in an endless conveyance element chain, to reduce the magnitude of wear-induced elongation. However, reducing the number of chain links reduces ride comfort and requires a larger sprocket to drive the conveyance element chain as chain links have a limited range of movement. A larger drive sprocket requires a higher torque from the drive system and takes up additional space. Furthermore, a gearbox is normally required to convert the high speed and low torque output of one or more drive motors into the low speed but high torque required by the drive sprocket. Because they are so bulky, the drive motor(s) and the gearbox are usually located in a dedicated machine room and connected to the drive sprocket with a main drive chain (which can also become worn), further increasing the footprint of the people conveyor. An alternative approach is desired.

SUMMARY

From a first aspect the present disclosure provides a drive system for a belt-driven people conveyor comprising: a drive motor arranged to drive an input shaft; a belt drive pulley for driving a drive belt; and a gear system arranged to couple the input shaft to the belt drive pulley such that there is a speed reduction from the input shaft to the belt drive pulley, the gear system comprising an output gear directly connected to or formed integrally with the belt drive pulley; wherein at least part of the gear system is located within the belt drive pulley.

It will be appreciated by those skilled in the art that the drive system of the present disclosure takes up less space than conventional systems, because the gear system is at least partially located in otherwise unused space within the belt drive pulley. Locating at least part of the gear system within the belt drive pulley can also reduce the noise emitted by the gear system, improving passenger experience. The use of a gear system to couple the input shaft to the belt drive pulley such that there is a speed reduction (i.e. such that in use the belt drive pulley rotates more slowly than the input shaft) means that a main drive chain may not be required, increasing the reliability of the drive system (as chain failure is no longer possible) whilst also easing maintenance as there is no need to frequently lubricate the chain and/or to monitor wear to the chain.

The present disclosure extends to a belt-driven people conveyor comprising: a plurality of conveyance elements arranged to travel along a conveyance path; a drive belt connected to the plurality of conveyance elements; and the drive system as disclosed herein, wherein the belt drive pulley is arranged to drive the drive belt to propel the plurality of conveyance elements along the conveyance path.

Using a (flexible) drive belt to propel the conveyance elements (e.g. escalator steps) is advantageous because the drive belt has no chain links and is therefore less liable to elongation than a step chain, because there are no chain link connections within a drive belt that can wear over time. As explained in more detail below, the radius of curvature of the drive belt is also not limited by link movement and the belt drive pulley may therefore have a smaller radius than an equivalent conventional chain sprocket, further reducing the space taken up by the drive system. A drive belt may also require no lubrication and may produce less noise than a chain.

The radius of a conventional drive sprocket for a step chain is normally constrained by the size and properties of the links of the step chain (the minimum radius is determined by the length and maximum articulation angle of each chain link). In a typical people conveyor comprising three chain links per step, the necessary sprocket radius is large, requiring a large drive torque and increasing the space taken up by the people conveyor. However, when a flexible drive belt is used many of these constraints do not apply and the radius of the drive sprocket can be reduced. This accordingly reduces the torque required to drive the drive belt and also reduces the footprint of the people conveyor. Preferably, the drive pulley has a diameter of less than 700 mm and may have a diameter of 500 mm or less, e.g. 300 mm or less. Reducing the diameter of the drive pulley reduces the torque required to drive the drive belt, and increases the angular speed of the drive pulley for the same step travel speed. For example, a conventional step chain drive sprocket may need to rotate at roughly 40 rpm (revolutions-per-minute), whilst a drive belt pulley may rotate at roughly 80 rpm for the same step travel speed.

The use of a gear system that is at least partially located within the belt drive pulley is thus particularly advantageous for a belt-driven people conveyor, because the gear system does not need to reduce the angular speed of a given drive motor output (e.g. 1000-1500 rpm) as much as a conventional people conveyor with a step chain, and thus may not need to be physically as large as a gearbox providing a greater speed reduction. The gear system may also not need to handle torques as large as those encountered in conventional systems (e.g. that use a larger radius step chain drive sprocket) which may further reduce size and material costs.

In some examples the drive belt may be toothed and the belt drive pulley may comprise a belt drive sprocket. In such examples, the number of teeth on the drive belt is also not limited by elongation considerations and a toothed drive belt may therefore be provided with more teeth per unit length than chain links of an equivalent step chain. This may result in a smoother ride quality (i.e. a more comfortable ride) and a more distributed drive load on the belt drive sprocket (i.e. with a lower force needing to be transmitted through each tooth of the drive sprocket).

People conveyors typically feature at least one brake arranged to stop or slow the movement of the conveyance elements e.g. in an emergency. As mentioned above, in conventional people conveyors the drive sprocket rotates much more slowly than the drive motor(s) and it is desirable to apply braking force to the fast-moving output of a drive motor rather than directly to a slow moving drive sprocket (over which the step chain passes). This is because the braking force required to brake the fast-moving output is lower and the size and cost of the brake can therefore be reduced. Typically, therefore, people conveyors brake the output of the drive motor before it is input to the gearbox and transmitted to the drive sprocket through the drive chain. If the drive chain slips or breaks, the braking force is no longer transmitted and the conveyance elements can move freely ("freewheeling"), which is dangerous.

However, in the drive system of the present disclosure, the gear system is directly coupled (via the output gear) to the belt drive pulley. This means that the input shaft (which is spinning faster than the belt drive pulley) is coupled to the belt drive pulley by only gear interactions, with no drive chain linking the belt drive pulley to a separate gearbox. Braking force can thus be applied to the fast-spinning input shaft without the risk of freewheeling due to chain failure. In some examples, therefore, the drive system comprises a brake system arranged to apply braking force to the input shaft. The brake system may comprise a brake and a brake disc connected to the input shaft.

The belt drive pulley may comprise a hollow cylinder, in which case at least part of the gear system is at least partially located within a cavity defined by the hollow cylinder so as to be radially enclosed by the belt drive pulley. The belt drive pulley may be partially or entirely open at one or both ends. Preferably, the entire gear system is located within the belt drive pulley (e.g. the gear system is fully enclosed within the belt drive pulley). In such examples, the input shaft may enter the belt drive pulley and be coupled to the gear system within the belt drive pulley. Entirely enclosing the gear system within the belt drive pulley may facilitate installation because the gear system and the belt drive pulley may be provided and installed as one component. Entirely enclosing the gear system within the belt drive pulley may also mean that lubricant is retained more readily, aiding maintenance.

The output gear may be formed integrally with the belt drive pulley, i.e., such that the belt drive pulley is part of the gear system. For example, an internal surface of the belt drive pulley may comprise radially-inwardly facing teeth so as to form the output gear (i.e. an integral output ring gear).

The gear system may comprise any type of gear system capable of providing the desired speed reduction and of being at least partially located within the belt drive pulley. For example, the gear system may comprise a planetary or epicyclic gear assembly, a cycloidal drive (e.g. a cyclo gear), a strain wave gear assembly (e.g. a harmonic drive or ellipsoid gear) or indeed any other suitable type of gear system known in the art per se. The gear system preferably comprises a gear assembly in which one gear (e.g. an input gear) is located radially inside another gear (e.g. an output gear), as this can be space efficient.

The gear system may comprise an input gear directly connected to the input shaft and at least one intermediate gear via which the output gear is coupled to the input gear. At least one of the input, output and intermediate gears may comprise a ring gear with radially-inwardly facing teeth. The gear system may comprise a carrier that connects the centres of one or more gears (e.g. one or more intermediate gears) together whilst still allowing individual rotation of the one or more gears about their centres.

In some sets of examples the gear system comprises a planetary or epicyclic gear assembly, comprising a sun gear, a ring gear and at least one planet gear (or set of planet gears) connected to a carrier and arranged to couple the sun gear to the ring gear. The carrier may be free to rotate, enabling the at least one planet gear to orbit around the sun gear. The planetary gear assembly may be configured in many different ways, with different combinations of the sun, ring and planet gears as input, output and intermediate gears. In some examples the intermediate gear(s) may be held stationary (e.g. relative to the rest of the people conveyor). The drive system may comprise a torque reaction bar arranged to rigidly couple an intermediate gear (or gears) of the gear system, or a carrier connected to one or more gears of the gear system, to a stationary component (such as a frame or truss of the people conveyor).

In one particular example the carrier that connects the planet gear(s) of the gear system is held stationary by a torque reaction bar (i.e. such that the planet gear(s) cannot orbit (i.e. revolve) around the sun gear).

The gear system may comprise a single-stage gear system, in which the input gear and output gears are coupled to the input gear via only one intermediate gear (or set of gears). For instance, in some examples where the gear system comprises a planetary gear assembly, the sun gear may comprise the input gear and the ring gear may comprise the output gear.

However, in some examples the gear system may comprise a multi-stage or compound gear system, in which a plurality of intermediate gears or sets of gears couple the input gear to the output gear. A multi-stage gear system may be able to facilitate a greater speed reduction without a large increase in size. A multi-stage gear system may, for instance, simply comprise two or more adjacently mounted gear assemblies coupled together, so as to facilitate a greater speed reduction without increasing the overall radius of the gear system. This is particularly useful because the radius of the gear system may be constrained by the radius of the belt drive pulley.

In one set of examples the gear system comprises a first planetary gear assembly mounted adjacent to a second planetary gear assembly, the first planetary gear assembly comprising a first sun gear and a first ring gear coupled by a first planet gear (or a first set of planet gears) connected to a first carrier, and the second planetary gear assembly comprising a second sun gear and a second ring gear coupled by a second planet gear (or a second set of planet gears) connected to a second carrier. The first and second planetary gear assemblies (i.e. the first and second stages of the multi-stage gear system) may be substantially coaxial (i.e. such that the sun gears, ring gears and carriers are all arranged to rotate around a common axis).

In such examples the input gear of the gear system may comprise the first sun gear, and the output gear may comprise the second ring gear. The first and second planetary gear assemblies may be coupled together in various configurations, but in one example the first carrier (connected to the first planet gear or set of planet gears) is connected to the second sun gear. The first ring gear may be fixed to the second ring gear. The second carrier may be fixed to be stationary relative to the other gears and to the belt drive pulley, such that the second planet gear (or the second set of planet gears) do not orbit around the second sun gear. The second carrier may for example be fixed rigidly to a frame or truss of the people conveyor, e.g., via a torque reaction bar.

In some examples a multi-stage gear system may comprise a combination of two or more different types of gear assembly. For example, the gear system may comprise a first gear assembly of a first type (e.g. planetary) coupled to a second gear assembly of a second type (e.g. cycloidal).

The gear system may be arranged such that the speed reduction from the input shaft to the belt drive pulley is at least 5:1, preferably at least 8:1 and further preferably at least 10:1, 15:1 or even 20:1 or more (e.g. to reduce an input shaft speed of approximately 500-2000 rpm to a belt drive pulley speed of approximately 50-150 rpm). In some preferred examples the gear system is arranged to reduce an input shaft speed of approximately 1000 rpm or more (e.g. 1500 rpm) to a belt drive pulley speed of approximately 100 rpm or less (e.g. 80 rpm).

The drive motor may be directly connected to the input shaft (i.e. the input shaft may comprise a rotor of the drive motor). However, in some examples the drive motor is coupled to the input shaft via a belt or chain. This may reduce the width of the drive system as the drive motor and the belt drive pulley may then be positioned adjacent to each other (i.e. aligned in the direction of movement of the people conveyor or with the motor vertically underneath the belt drive pulley). It will be appreciated that the use of a belt or chain to couple the drive motor to the input shaft does not negate the benefits of the present disclosure because a chain link may still be avoided between the fast-spinning input shaft and the slow-spinning belt drive pulley.

In some examples the drive system may comprise a second belt drive pulley for driving a second drive belt (also coupled to the plurality of conveyance elements). For example, the first and second drive belts may be located towards either side of the plurality of conveyance elements. This may increase the load capacity of the drive system and/or provide a more symmetrical drive force to the conveyance elements.

In examples featuring a second belt drive pulley, the second belt drive pulley may be driven by the same drive motor as the first belt drive pulley. In such examples, the second belt drive pulley may be rigidly coupled to the first belt drive pulley and coupled to the input shaft by the gear system. Of course, in other examples each belt drive pulley may comprise its own gear system, where the input shaft is coupled to the second belt pulley with a second gear system. In such examples the second gear system may comprise an output gear directly connected to or formed integrally with the second belt drive pulley. In some examples at least part of the second gear system may be located within the second belt drive pulley. Preferably the first and second gear systems are substantially identical (e.g. providing the same speed reduction).

In some examples, the drive system may comprise a second drive motor. The second drive motor may be arranged to provide additional drive force to the input shaft. In some examples the second drive motor is arranged to drive a second input shaft. A second gear system as described above may be arranged to couple the second input shaft to the second belt drive pulley, the second gear system comprising an output gear directly connected to or formed integrally with the second belt drive pulley. In such examples, even though the first and second belt drive pulleys are separately coupled to two separate drive motors, it may be advantageous in some examples to fix (i.e. to rigidly couple) the first belt drive pulley to the second belt drive pulley, e.g. with a hollow drive shaft, to synchronise their rotation (even if the drive motors are inherently asynchronous) and apply a symmetrical drive force to the conveyance elements.

Providing a second drive motor may increase the drive power of the drive system, thus increasing the load capacity of a people conveyor and/or the rise of an escalator that the drive system can support.

The drive system may comprise an auxiliary brake system. The auxiliary brake system may comprise an auxiliary brake and an auxiliary brake disc. Providing an auxiliary brake system may increase the braking power of the drive system (e.g. over a drive system with only a single main brake) and/or may provide redundancy in case of a failure of a main brake. The auxiliary brake system may be arranged to apply braking force to the input shaft. The brake system and the auxiliary brake system may be identical.

In some examples featuring a second drive motor arranged to drive a second input shaft (independently of the (first) input shaft), an auxiliary brake system may be arranged to provide braking force to the second input shaft (e.g. the auxiliary brake system comprising an auxiliary brake and an auxiliary brake disc connected to the second input shaft).

In some examples the people conveyor comprises an escalator, wherein the conveyance elements comprise escalator steps arranged to carry passengers up or down an inclined conveyance path. The present disclosure is particularly relevant to escalators because the inclined path means that the drive system can be located in a space below the steps (e.g. under a landing region) created by the incline. Of course the disclosure may equally be applied to other types of people conveyors such as moving walkways (e.g. level or inclined moving walkways).

More generally, features of any example described herein may, wherever appropriate, be applied to any other example described herein. Where reference is made to different examples or sets of examples, it should be understood that these are not necessarily distinct but may overlap.

DRAWING DESCRIPTION

Certain examples of the present disclosure will now be described with reference to the accompanying drawings in which:

FIGS. 2 and 3 show a drive system according to an example of the present disclosure;

DETAILED DESCRIPTION

Figure 1:
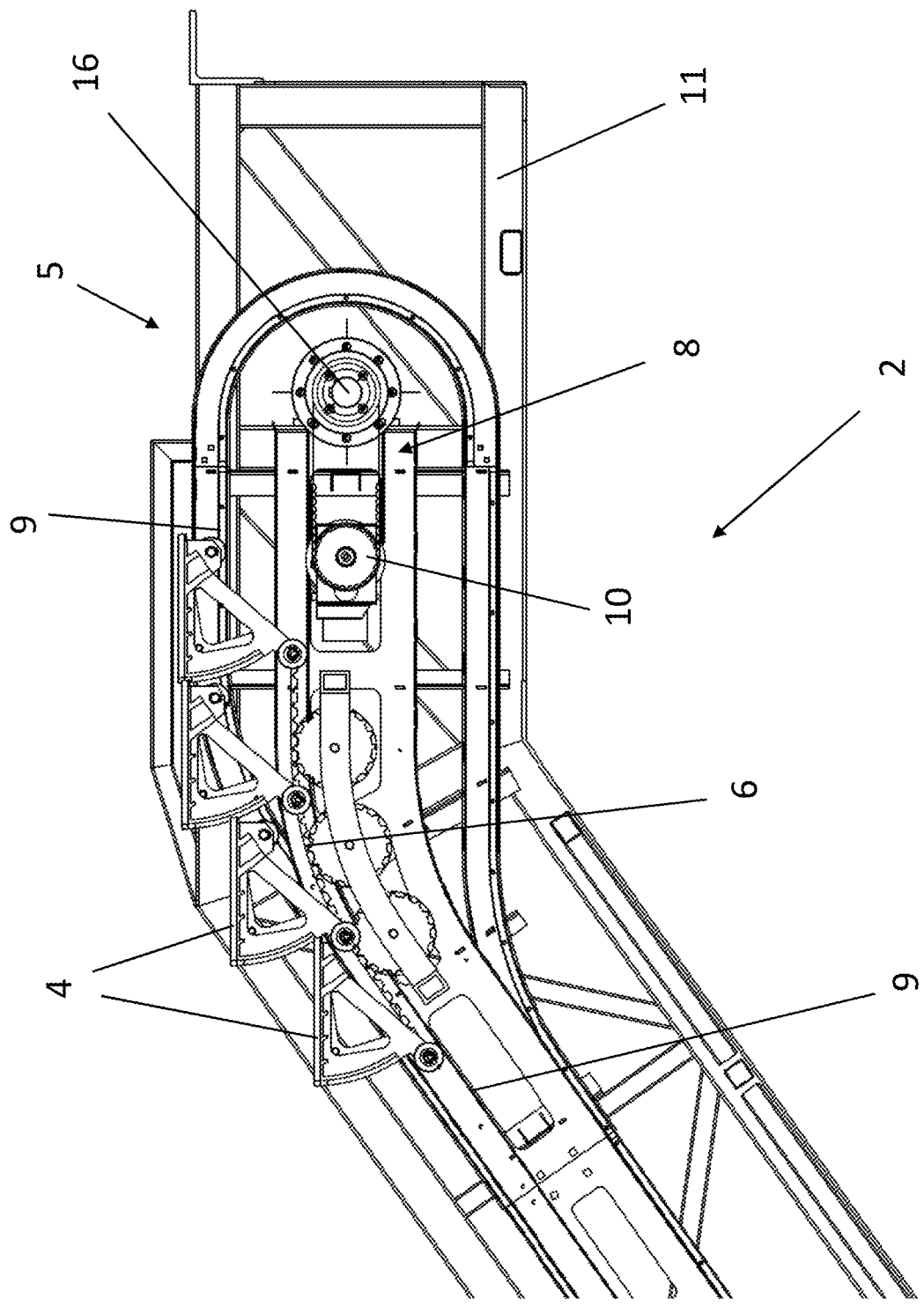
FIG. 1 is a cross section view of the upper landing of a people conveyor according to an example of the present disclosure.
Figure 4:
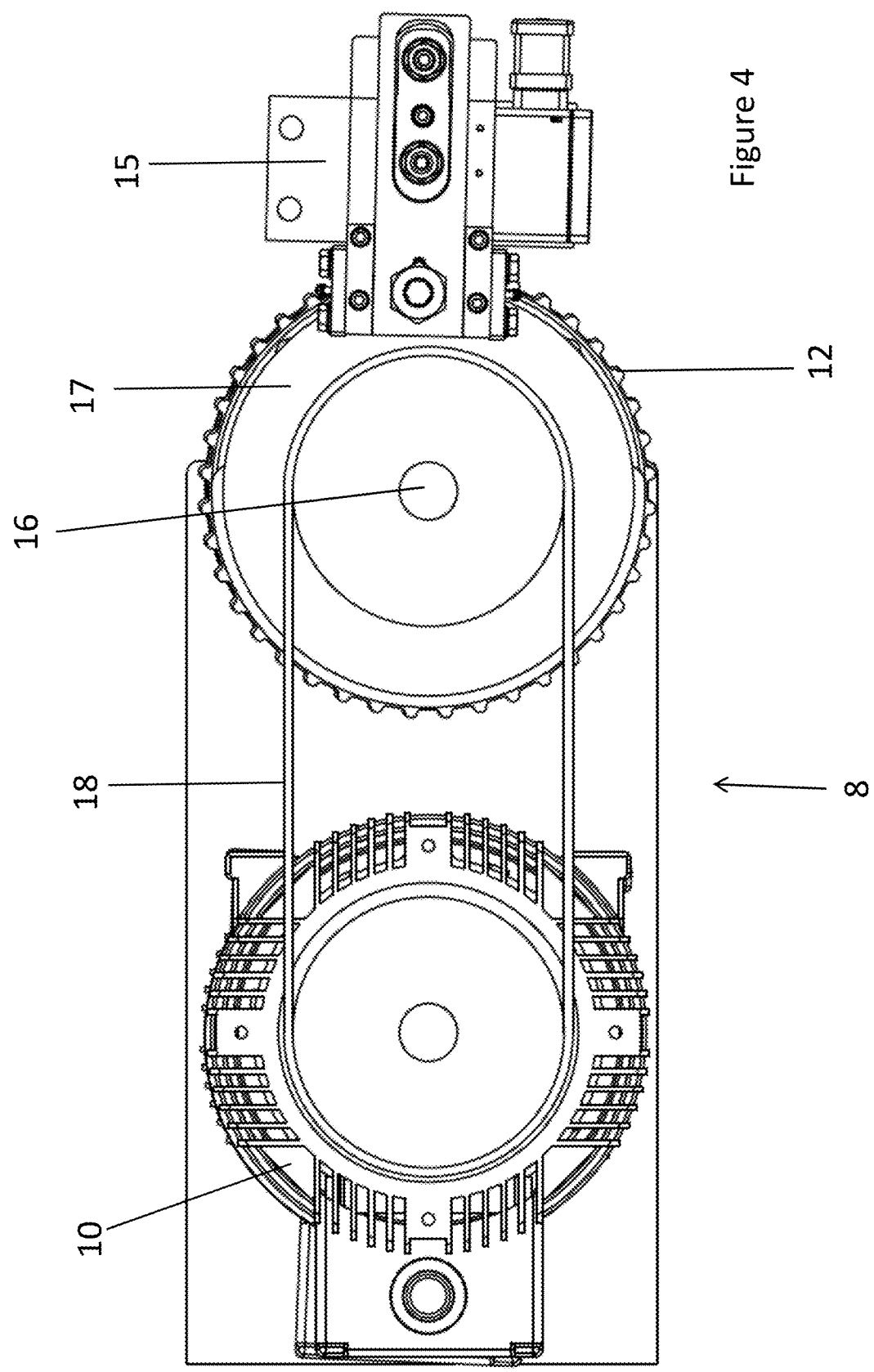
FIG. 4 is a side view of the drive system.
Figure 5:
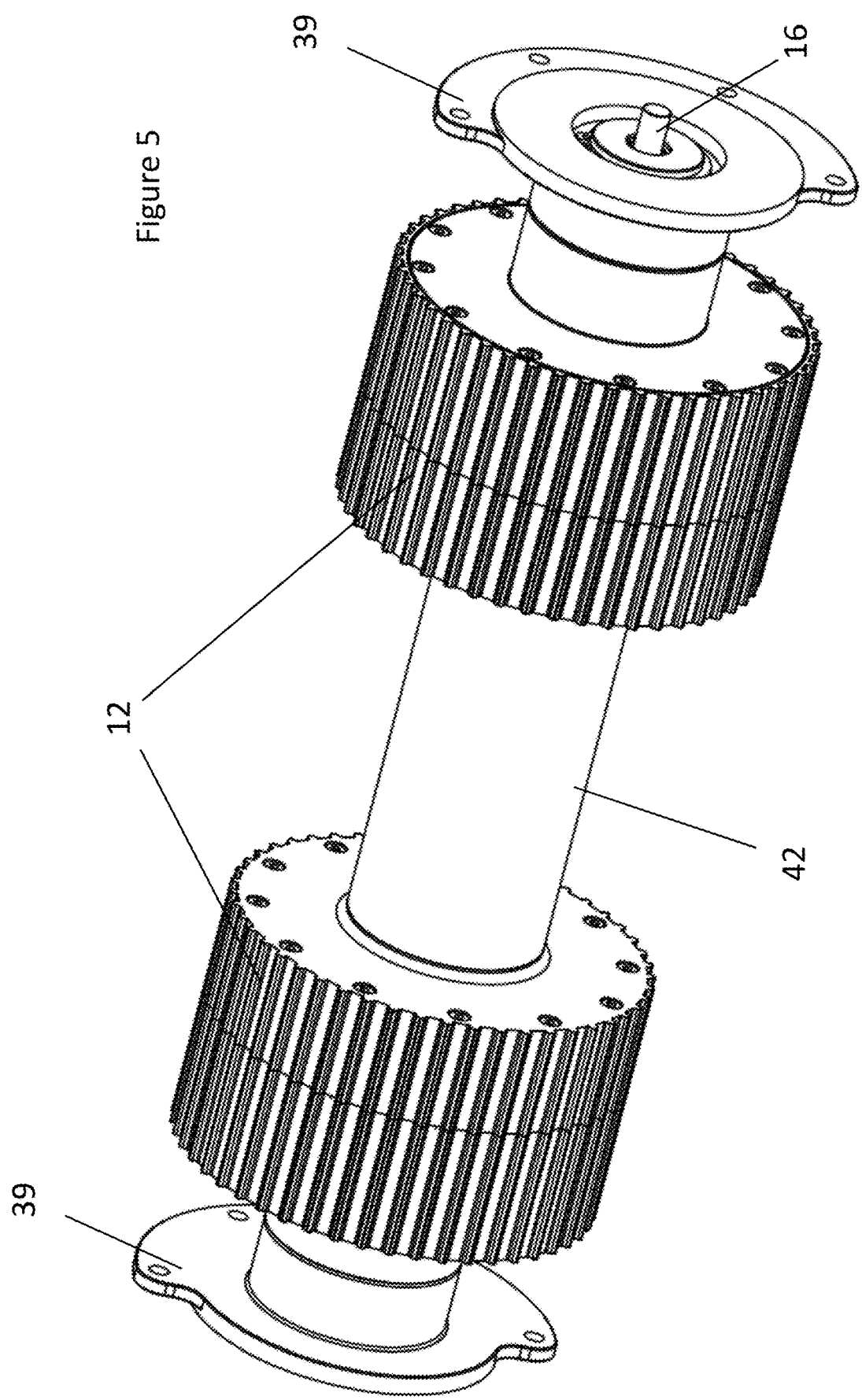
FIG. 5 is a partial view of the drive system.

FIG. 1 shows a people conveyor 2 (in this example an escalator) comprising a plurality of conveyance elements 4 (escalator steps) arranged to travel along an inclined conveyance path between two horizontal landing regions (only the upper landing region 5 is shown in FIG. 1). The conveyance elements 4 are connected to a pair of drive belts 6 (only part of one drive belt can be seen in FIG. 1) which are driven by a drive system 8 to propel the conveyance elements 4 along the conveyance path. The conveyance elements 4 travel along guide rails 9 which are fixed to a truss 11. The drive system 8 is also fixed to the truss 11, mounted in the upper landing region 5 underneath the conveyance elements 4.

As shown in more detail in FIGS. 2, 3, 4 and 5, the drive system 8 comprises a pair of drive motors 10 (e.g. asynchronous motors) and a pair of belt drive pulleys 12. Each belt drive pulley 12 is arranged to engage with and drive one of the drive belts 6 to propel the conveyance elements 4 along the conveyance path.

Each drive motor 10 is arranged to drive an input shaft 16 via a belt 18. The input shaft 16 is coaxial to the belt drive pulleys 12. The drive motor 10 and the input shaft 16 are coupled via pulleys with the same radius, such that the input shaft 16 is driven to rotate at the same speed as the drive motor 10 (e.g. approximately 1000 rpm), although it will be appreciated that this need not be the case. The input shaft 16 is coupled to each belt drive pulley 12 via a gear system that is fully enclosed within each belt drive pulley 12. A main brake system 14 (comprising a main brake 15 and a main brake disc 17) is arranged to apply braking force to one of the input shafts 16. FIG. 3 shows an example of the drive system 8 that also features an auxiliary brake system 19 (comprising an auxiliary brake 21 and an auxiliary brake disc 23) which is arranged to brake the other input shaft 16.

Figure 6:
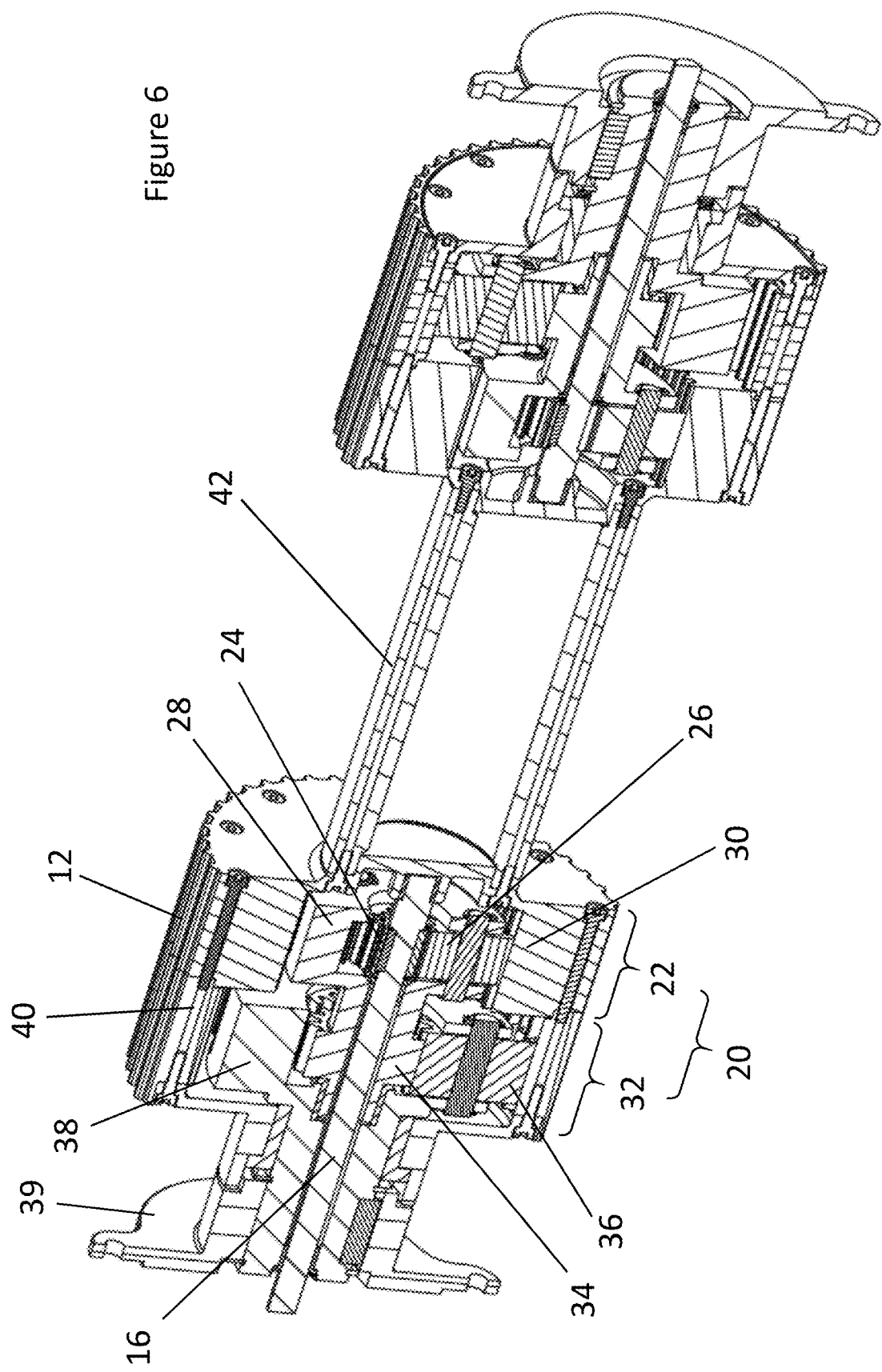
FIGS. 6 and 7 are cross sections of the drive system of FIG. 5 showing a gear system thereof.
Figure 7:
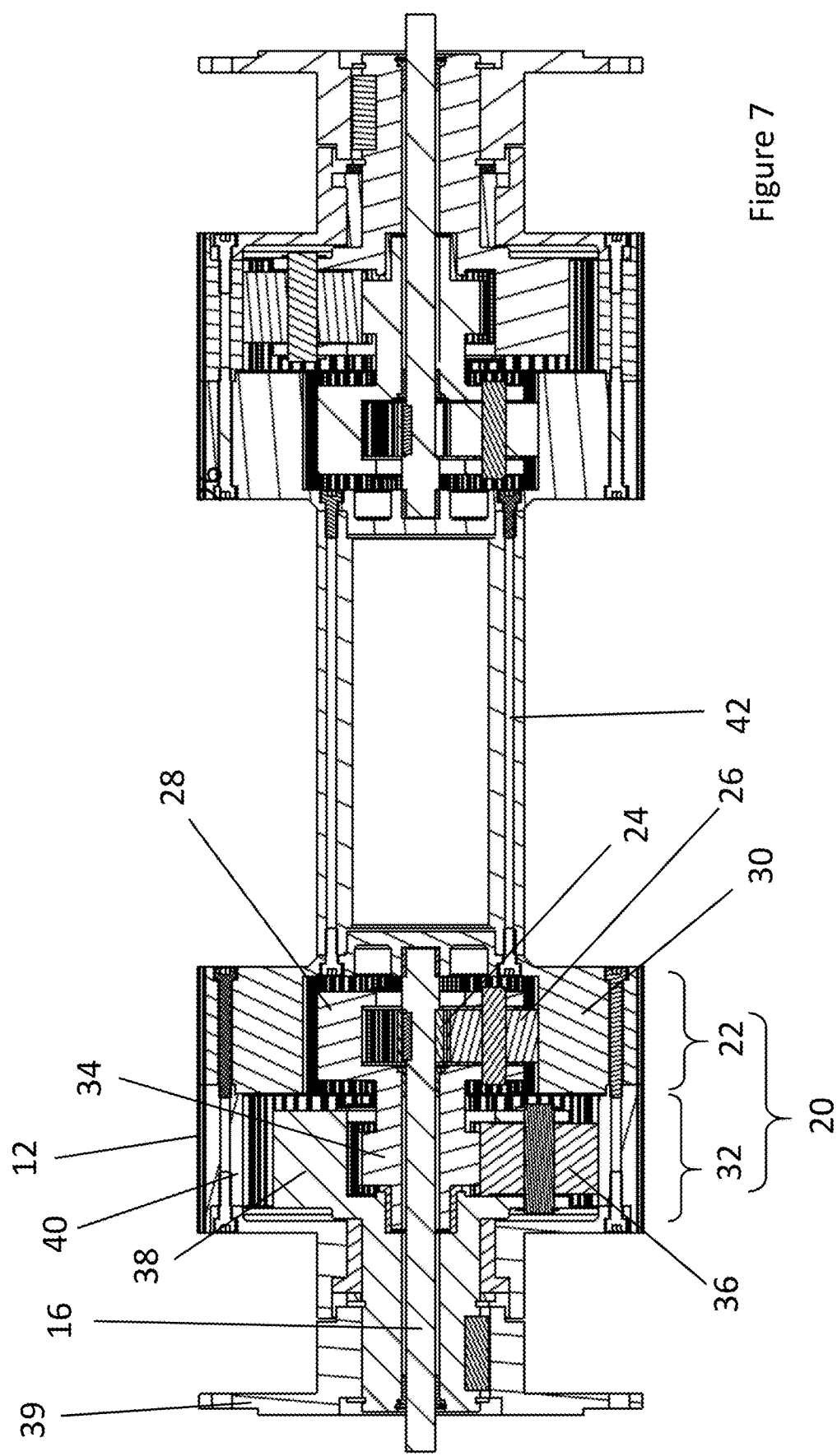
Figure 8:
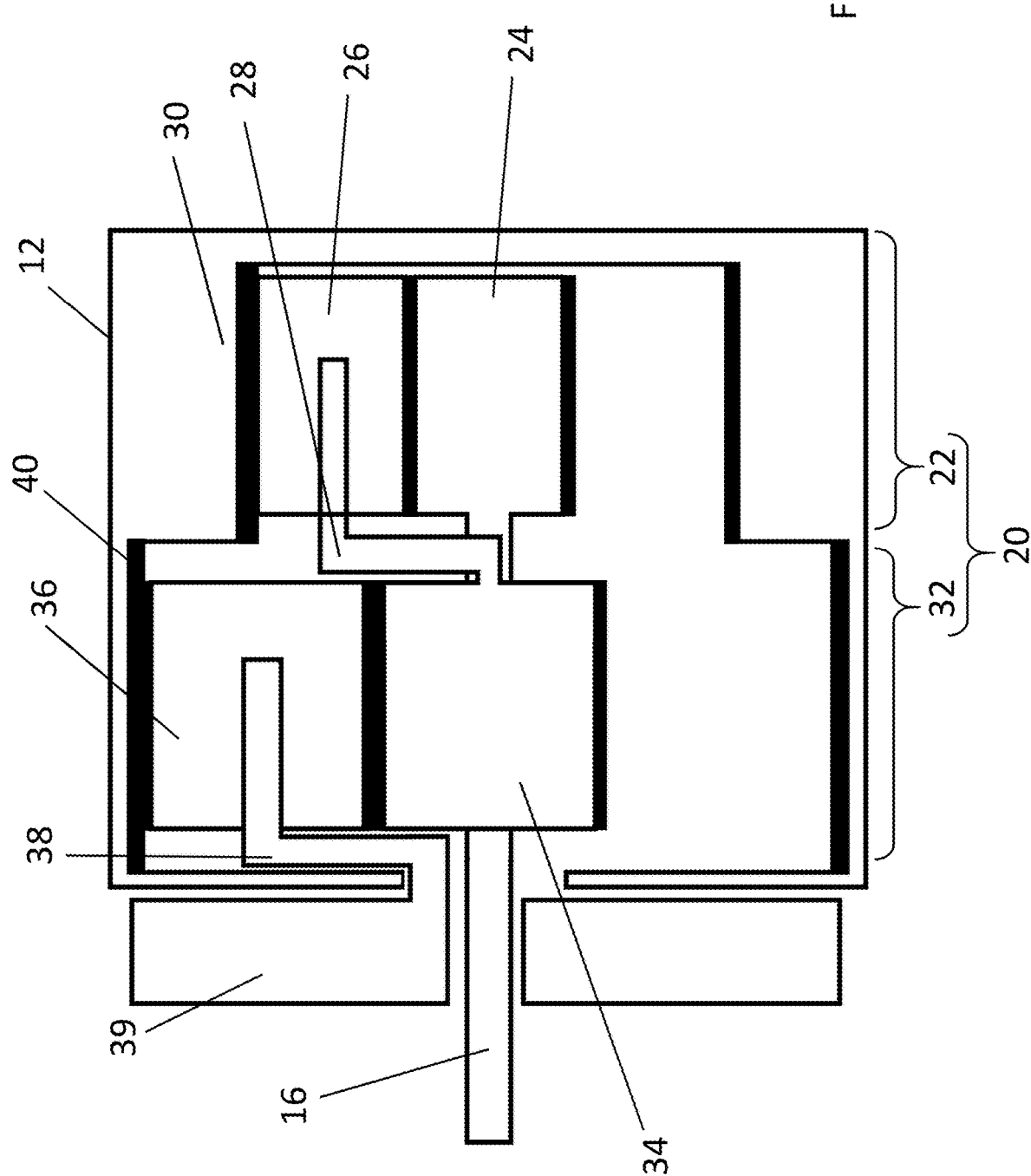
FIG. 8 is a simplified partial cross section view of the gear system.

One example of a gear system 20 that may be enclosed within each belt drive pulley 12 is shown in FIGS. 6-8. Each gear system 20 comprises a two-stage planetary gear assembly enclosed within each belt drive pulley 12. Only one gear system 20 is labelled in FIGS. 6 and 7, and FIG. 8 shows a simplified view of only one gear system 20. However, the other gear system 20 is simply a mirror image and operates in the same way.

Each gear system 20 comprises a first stage 22, comprising a first sun gear 24, a first set of planet gears 26 coupled to a first carrier 28 and a first ring gear 30; and a second stage 32, comprising a second sun gear 34, a second set of planet gears 36 coupled to a second carrier 38 and a second ring gear 40. In the cross section of FIG. 8 only one planet gear of each set is visible.

The input shaft 16 is connected to the first sun gear 24, which thus comprises an input gear of the gear system 20. The belt drive pulley 12 is formed integrally with the second ring gear 40 (i.e. an inside surface of the belt drive pulley 12 is toothed), which thus comprises an output gear of the gear system 20. The input and output gears are coupled via intermediate gears, which are in this case the first set of planet gears 26 coupled to the first carrier 28, the first ring gear 30, the second sun gear 34 and the second set of planet gears 36 coupled to the second carrier 38.

The first sun gear 24 is engaged with the first set of planet gears 26 which are, in turn, engaged with the first ring gear 30. The second carrier 38 is rigidly fixed to the truss 11 of the people conveyor 2 by a torque reaction bar 39, such that the second set of planet gears 36 cannot orbit around the second sun gear 34.

As the input shaft 16 is driven at a high speed (e.g. 1500 rpm) by the drive motor 10, it drives the first sun gear 24 to rotate which, in turn, drives each of the planet gears 26 to rotate about their own axes and the set of planet gears 26 to orbit about the first sun gear 24, rotating the first carrier 28. The first carrier 28 rotates at a slower speed than the sun gear 24.

As mentioned above, the first carrier 28 is connected to the second sun gear 34, which is thus driven to rotate. Because the second carrier 38 is rigidly fixed in place, the second set of planet gears 36 rotate about their own axes but do not orbit around the second sun gear 34. This causes the second ring gear 40 (and thus the belt drive pulley 12) to rotate at an even lower speed (e.g. 80 rpm) than the second sun gear 34. The gear system 20 thus couples the input shaft 16 to the belt drive pulley 12 with a significant speed reduction, whilst taking up only a small space.

The belt drive pulleys 12 are connected together with a hollow drive shaft 42 to synchronise their rotation. This means that the belt drive pulleys 12 will always rotate at the same speed, even if the drive forces provided by the drive motors 10 are not precisely equal. This ensures a symmetric application of drive force to the conveyance elements 4.

Figure 9:
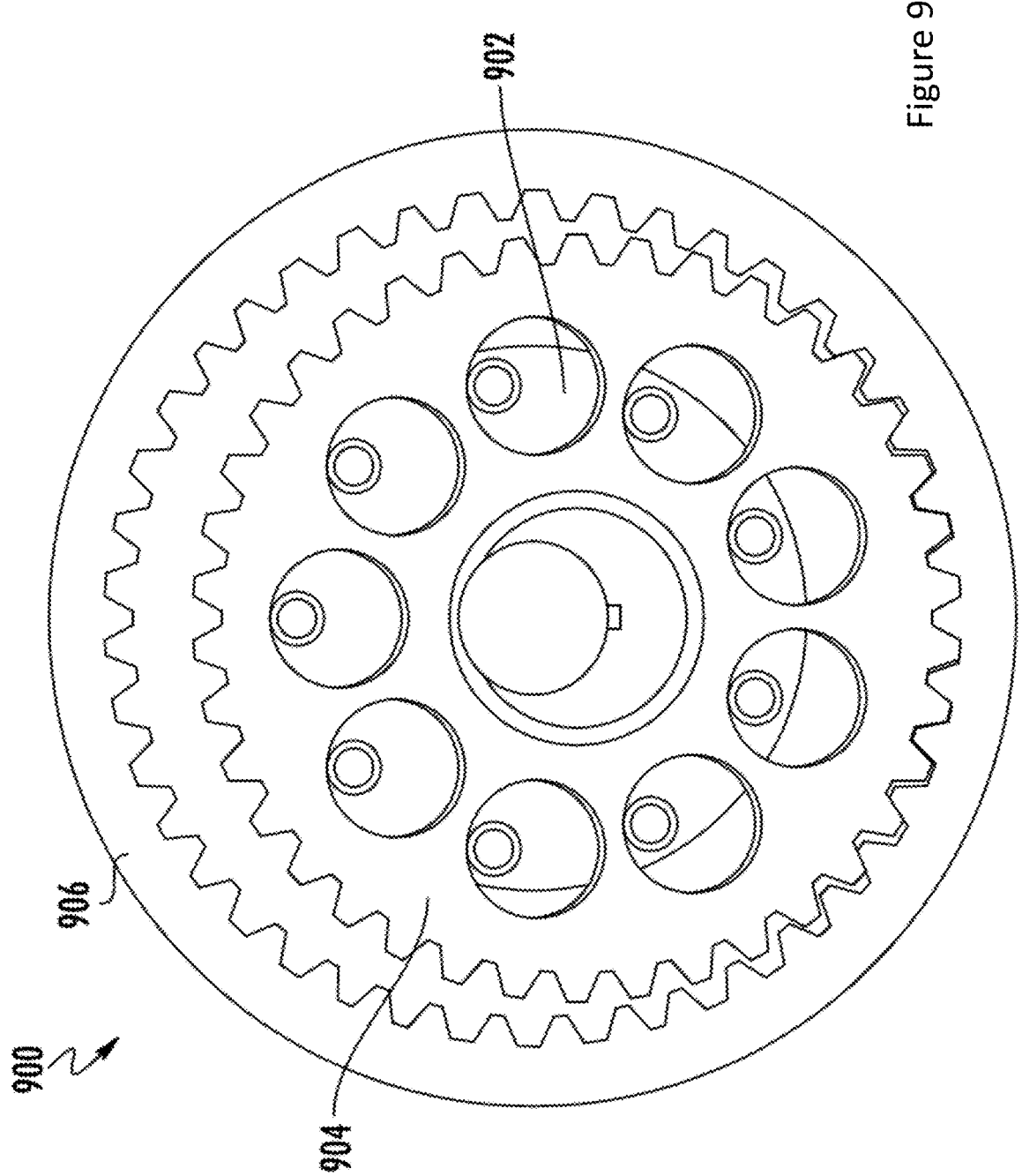
FIG. 9 shows an alternative gear system.

FIG. 9 shows a cycloid gear assembly 900 which may be used as an alternative gear system or as part of a gear system (e.g. as a stage of a multi-stage gear system) in a drive system similar to that described above. The cycloid gear assembly 900 comprises an input gear 902, an intermediate gear 904 and an output ring gear 906. The ring gear 906 comprises radially inwardly-facing teeth that engage with radially outwardly-facing teeth on the intermediate gear 904. The intermediate gear 904 couples the input gear 902 to the output gear 906 with a large speed reduction. When used in a drive system such as that described above, the input gear 902 is driven by a (high speed) drive motor and the ring gear 906 is directly connected to or formed integrally with a belt drive pulley (which rotates slowly).

Figure 10:
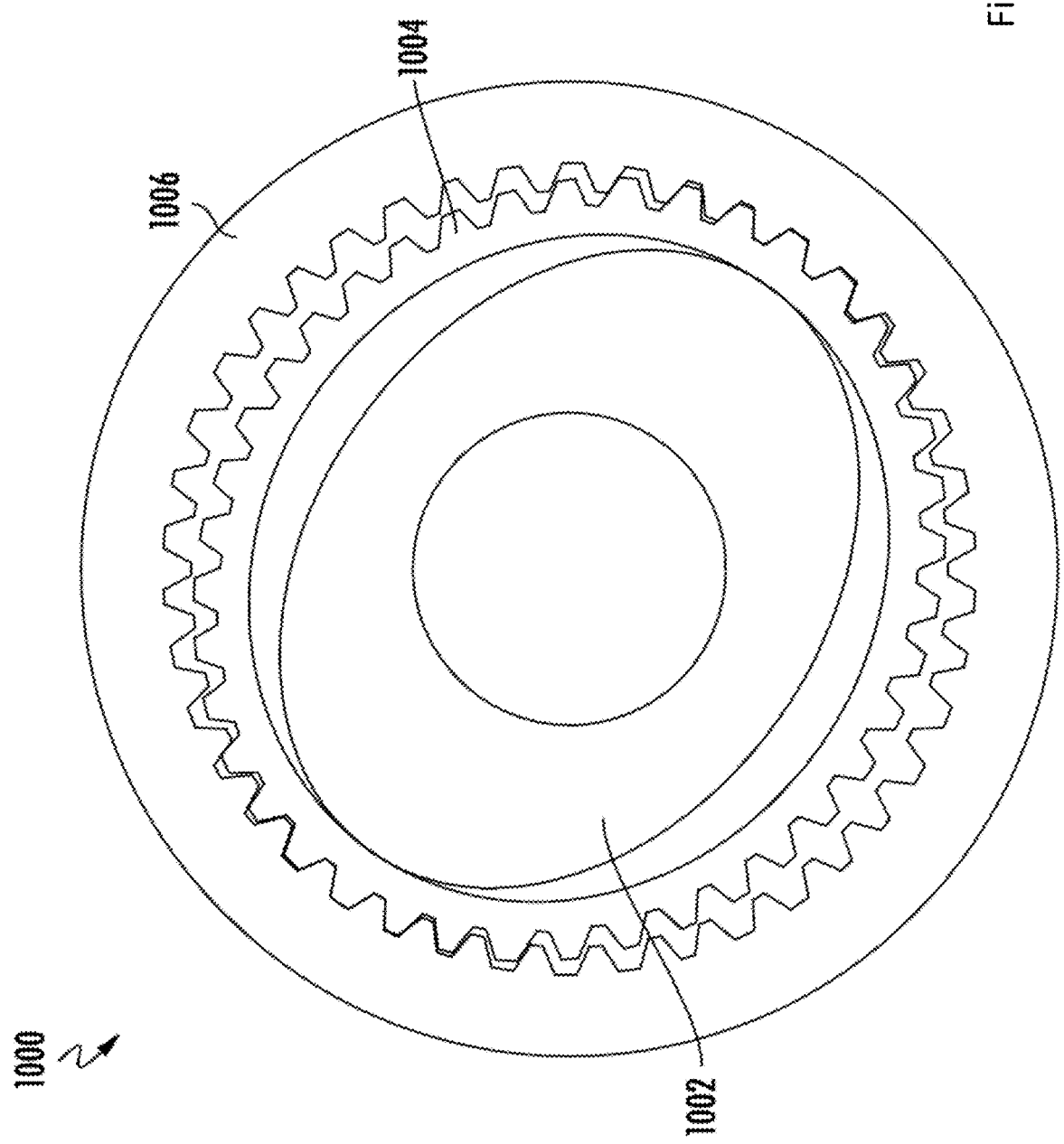
FIG. 10 shows another alternative gear system.

FIG. 10 shows a strain wave gear assembly 1000 (also referred to as a Harmonic drive or an ellipsoid gear) which may be also used as an alternative gear system or as part of a gear system (e.g. as a stage of a multi-stage gear system). The strain wave gear assembly 1000 comprises an input component 1002 with an elliptical cross section, a deformable intermediate gear 1004 and an output ring gear 1006. The output ring gear 1006 comprises radially inwardly-facing teeth that engage with radially outwardly-facing teeth on the intermediate gear 1004. The intermediate gear 1004 couples the input component 1002 to the output ring gear 1006 with a large speed reduction. When used in a drive system such as that described above, the input component 1002 is driven by a drive motor and the output ring gear 1006 is directly connected to or formed integrally with a belt drive pulley (which rotates slowly).

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. A drive system (8) for a belt-driven people conveyor (2) comprising:
    a drive motor (10) arranged to drive an input shaft (16);
    a belt drive pulley (12) for driving a drive belt (6); and a gear system (20, 900, 1000) arranged to couple the input shaft (16) to the belt drive pulley (12) such that there is a speed reduction from the input shaft (16) to the belt drive pulley (12), the gear system (20, 900, 1000) comprising an output gear (40, 906, 1006) directly connected to or formed integrally with the belt drive pulley (12);

wherein at least part of the gear system (20, 900, 1000) is located within the belt drive pulley (12).

2. The drive system (8) as claimed in claim 1, wherein the gear system (20, 900, 1000) is fully enclosed within the belt drive pulley (12).

3. The drive system (8) as claimed in claim 1, wherein an internal surface of the belt drive pulley (12) comprises radially-inwardly facing teeth so as to form the output gear (40, 906, 1006).

4. The drive system (8) as claimed in claim 1, comprising a brake system (14) arranged to apply braking force to the input shaft (16).

5. The drive system (8) as claimed in claim 1, wherein the gear system (20, 900, 1000) comprises an input gear (24, 902, 1002) directly connected to the input shaft (16) and at least one intermediate gear (26, 28, 30, 34, 36, 38, 904, 1004) via which the output gear (40, 906, 1006) is coupled to the input gear (24, 902, 1002).

6. The drive system (8) as claimed in claim 1, wherein the gear system (20) comprises a planetary gear assembly (22, 32) comprising a sun gear (24, 34), a ring gear (30, 40) and at least one planet gear (26, 36) connected to a carrier (28, 38) and arranged to couple the sun gear (24, 34) to the ring gear (30, 40).

7. The drive system (8) as claimed in claim 1, wherein the gear system (20) comprises a multi-stage gear system.

8. The drive system (8) as claimed in claim 1, wherein the gear system (20) comprises a first planetary gear assembly (22) mounted adjacent to and coupled to a second planetary gear assembly (32).

9. The drive system (8) as claimed in claim 1, wherein the gear system (20, 900, 1000) is arranged to provide a speed reduction from the input shaft (16) to the belt drive pulley (12) of at least 5:1.

10. A drive system (8) for a belt-driven people conveyor (2) comprising:
a drive motor (10) arranged to drive an input shaft (16);
a belt drive pulley (12) for driving a drive belt (6); and
a gear system (20, 900, 1000) arranged to couple the input shaft (16) to the belt drive pulley (12) such that there is a speed reduction from the input shaft (16) to the belt drive pulley (12), the gear system (20, 900, 1000) comprising an output gear (40, 906, 1006) directly connected to or formed integrally with the belt drive pulley (12);

wherein at least part of the gear system (20, 900, 1000) is located within the belt drive pulley (12);

further comprising a second belt drive pulley (12) for driving a second drive belt (6).

11. The drive system (8) as claimed in claim 10, further comprising a second drive motor (10) arranged to drive a second input shaft (16), and a second gear system (20, 900, 1000) arranged to couple the second input shaft (16) to the second belt drive pulley (12), the second gear system (20, 900, 1000) comprising an output gear (40, 906, 1006) directly connected to or formed integrally with the second belt drive pulley (12).

12. The drive system (8) as claimed in claim 10, wherein the first belt drive pulley (12) is fixed to the second belt drive pulley (12).

13. The drive system (8) as claimed in claim 11, comprising an auxiliary brake system (19) arranged to apply braking force to the second input shaft (16).

14. A belt-driven people conveyor (2) comprising:
a plurality of conveyance elements (4) arranged to travel along a conveyance path;
a drive belt (6) connected to the plurality of conveyance elements (4); and
the drive system (8) of claim 1, wherein the belt drive pulley (12) is arranged to drive the drive belt (6) to propel the plurality of conveyance elements (4) along the conveyance path.

15. A belt-driven escalator (2) comprising:
a plurality of escalator steps (4) arranged to travel along an inclined conveyance path;
a drive belt (6) connected to the plurality of escalator steps (4); and
the drive system (8) of claim 1, wherein the belt drive pulley (12) is arranged to drive the drive belt (6) to propel the plurality of escalator steps (4) along the inclined conveyance path.

* * * * *